April 30, 1963 G. B. HERTING 3,087,349
HYDRAULIC ADJUSTABLE PERIPHERAL HUB AND WHEEL COMBINATION
Filed Nov. 28, 1960 3 Sheets-Sheet 1

INVENTOR.
Gale B. Herting
BY
Sam J. Slotsky
ATTORNEY

April 30, 1963 G. B. HERTING 3,087,349
HYDRAULIC ADJUSTABLE PERIPHERAL HUB AND WHEEL COMBINATION
Filed Nov. 28, 1960 3 Sheets-Sheet 3

INVENTOR.
Gale B. Herting
BY
Sam J. Slotsky
ATTORNEY

3,087,349
Patented Apr. 30, 1963

3,087,349
HYDRAULIC ADJUSTABLE PERIPHERAL HUB
AND WHEEL COMBINATION
Gale B. Herting, Lyons, Minnehaha County, S. Dak.
Filed Nov. 28, 1960, Ser. No. 72,127
1 Claim. (Cl. 74—230.18)

My invention relates to an adjustable peripheral wheel or hub.

An object of my invention is to provide a hydraulic adjustable peripheral hub and wheel combination, whereby the extreme peripheral boundaries of the same can be automatically and uniformly forced radially outwardly, while in motion, by hydraulic or mechanical pressure exerted on the internal mechanism of said hub or wheel.

A further object of my invention is to provide an arrangement in which the peripheral or segments of the same can be radially moved either through hydraulic means or mechanical means, or a combination of both.

A further object of my invention is to provide an arrangement in which a variety of pulley faces can be attached to the unit.

A further object of my invention is to provide a variety of other advantages as will be apparent from the description herein.

Figure 1:
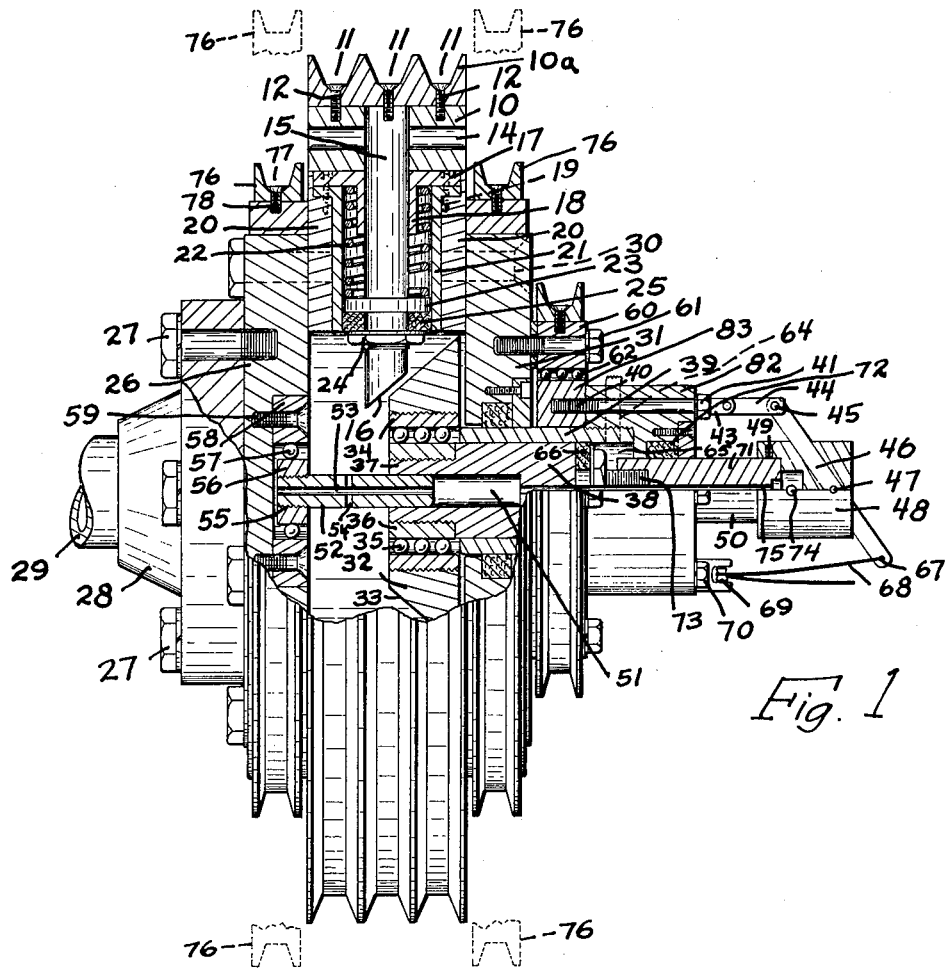
Figure 2:
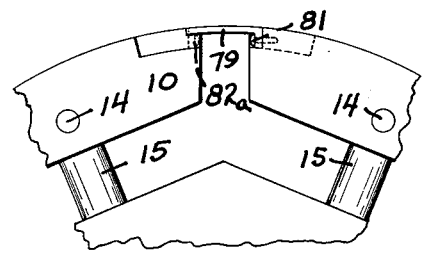
Figure 3:
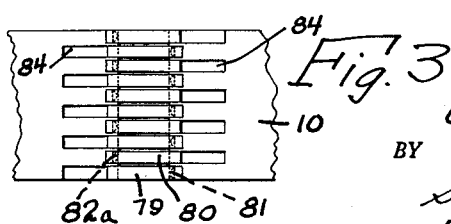
Figure 4:
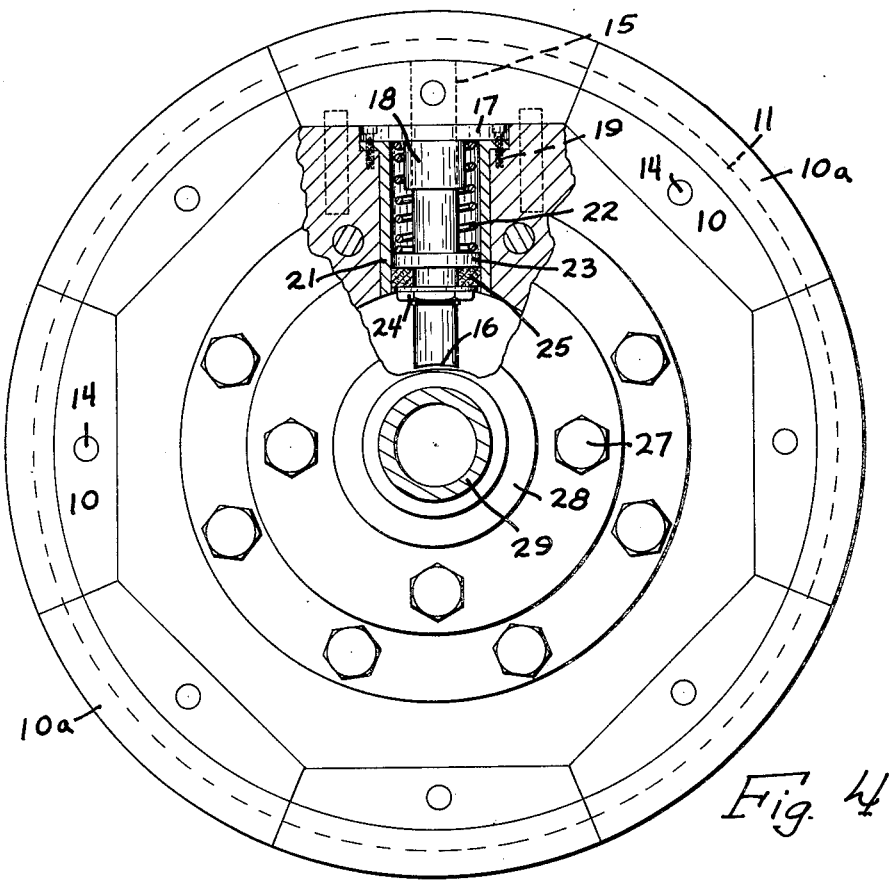
Figure 5:
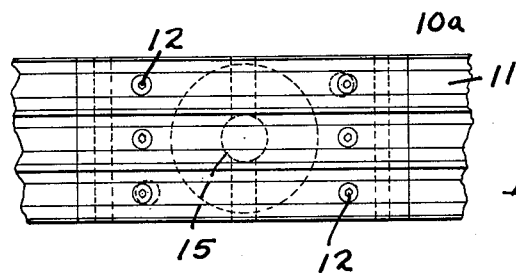
Figure 6:
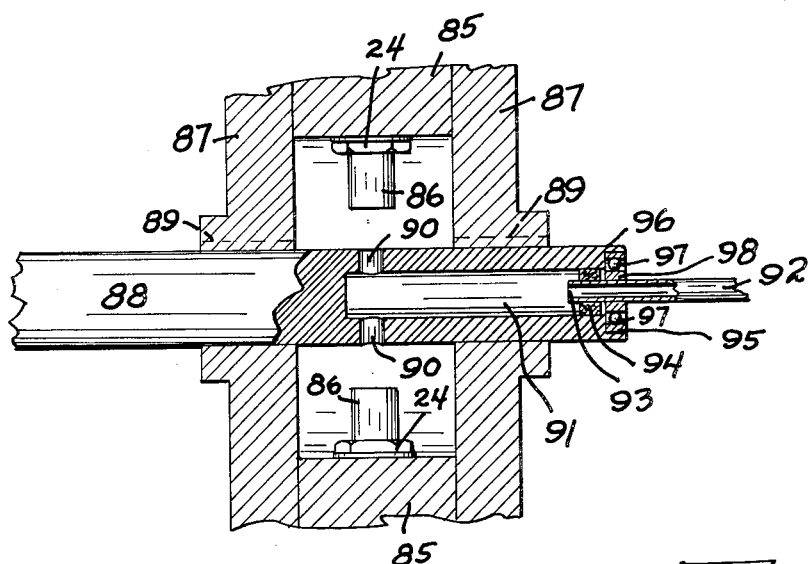
Figures 7, 8:
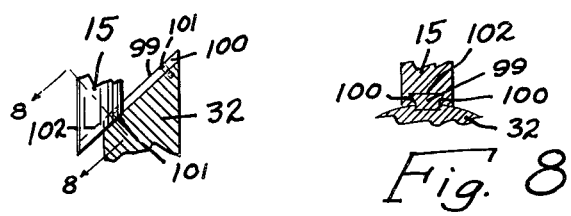

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

FIGURE 1 is a longitudinal partial cross section of my hub or wheel,
FIGURE 2 is a side view of a modification,
FIGURE 3 is a plan view of FIGURE 2,
FIGURE 4 is a forward view,
FIGURE 5 is a plan view of FIGURE 4,
FIGURE 6 is a partial view of a modification,
FIGURE 7 is a further modification, and
FIGURE 8 is a sectional view taken along the lines 8—8 of FIGURE 7.

My invention contemplates the provision of a wheel or hub, in which the hub or wheel can be expanded peripherally or circumferentially when in running condition so as to change the speed or power requirements, and without thereby requiring the change of belts to different diameter pulleys and the like, other reasons for my invention being apparent.

I have used the character 10 to designate a series of arcuate segments which when placed together in the reduced form will appear as shown in FIGURE 4, further segments 10a including the belt-receiving cavities 11, it being understood, however, that any other type of cavities can be used without departing from the essential spirit of my invention, these members 10a being secured by means of the machine screws 12 to the members 10, the character 14 indicating a transverse pin which secures the vertically positioned rod or post 15 to the member 10, the post 15 terminating in the lower tapered face 16.

It will be understood herein that the present description refers to a single segmental portion, it being noted, however, that there can be provided six, eight (as shown) or any desired number of segments consistent with providing a complete circular formation.

The character 17 indicates a flanged member terminating in the cylindrical portion 18, the flanged member being attached as at 19 to the further portion 20.

The character 21 indicates a further cylindrical member received in the portion 20 and being secured to the portion 20 by means of the same fastening means 19, and bearing against the flange 17 is a helical compression spring 22, which bears against an expanded collar portion 23 which is secured to the member 15, and received between the member 23 and the nut 24 is a circular packing gland 25. The width of portion 20 may be increased to accommodate a plurality of related members in side by side relationship.

The character 26 indicates a further portion of the hub to which is attached by means of the bolts 27 the end piece 28 to which is attached the drive shaft 29. The character 30 indicates bolts for attaching the portion 31 to the wheel structure. The portions 31 and 26 can be increased to any desired diameter so that the part 20 could in effect provide a hub.

The character 32 indicates a frusto-conical member having the tapered walls 33 adapted to bear against the bevelled portion 16, the member 32 being threadably secured to the bearing 34 which rotates upon the ball bearing units 35, which ball bearing units rotate on the inner bearing surface 36, which bearing 36 is threadably fastened to the end portion 37 of the member 38, which member 38 is received in the cylindrical member 39, which is threadably attached to a cap 82, which cap 82 is secured to the inner race 83 at 40 by means of a bolt 41. The extending portion 43 of bolt 41 is secured to the link 44, which link is pivoted at 45 to a lever 46 which is pivoted at 47 to the support 48 which is secured as at 49 to the further member 50, which is secured to the member 73, which provides a portion of member 38, the member 38 including the cylindrical cavity at 51 in which the longitudinal pin 52 moves, the pin 52 including the longitudinal opening 53 and further openings as at 54, the pin 52 being threadably attached as at 55 to the bearing member 56 which engages the ball bearings 57 which bear against the further annular member 58 which is attached as at 59 to the portion 26.

The character 60 indicates a flange which is attached as at 61 to the portion 31, the character 62 indicating ball bearings bearing on the stationary portion 83. The character 64 indicates a tube carrying a hydraulic supply under the desired pressure into the space 65, such hydraulic pressure bearing against the end of the member 66 which moves slidably within the member 39 to thereby move the frusto-conical surface 32.

The lever 46 is attached as at 67 to a cable 68 which passes over a pulley 69 secured as at 70. Pulling on the cable 68 from a remote distance will move the surfaces 32 against the surfaces 16 in the same manner as the hydraulic arrangement so that in the manner the unit can be used as a hydraulic unit or a mechanical unit to provide the same result.

The character 71 indicates a further piece which engages a further packing gland 72; the piece 71 being attached to the threaded part 73 which is attached to the part 38, the parts 50, 73, etc. being in fixed position and not rotating with the balance of the pulley or wheel as will be evident from the description given. The character 66 indicates a packing gland at the end of part 38.

It will be obvious from the foregoing description, and as explained above, that the hydraulic supply such as oil will pass through the tube 64, thence into the space 65, and thence against the face of the member 38 to thereby move the frusto-conical member 32 against the surfaces 16, which will thereby force all of the segmented portions 10 radially outwardly, to thereby change the complete diameter and circumference of the entire pulley or wheel, with the springs 22 carrying the arrangement back to the position shown when the pressure is released. Also, if desired, an oil circuit can be provided as at 74, which oil pressure will pass through the longitudinal openings 75 in the pieces 71, 73, and 38, which oil pressure will pass into the opening at 51, and thence through the opening 53 and openings 54 whereby this pressure will be also exerted against the faces 16 to provide a similar result.

The assemblage of the various stationary portions 63, the lever 46 etc. will always be in fixed position and can thereby be controlled by the hydraulic supply as well as the mechanical arrangement with efficient results, since these parts will not be rotating.

The character 76 indicates solid circular or annular members having the belt grooves 77, which are attached by means of the screws 78 as shown in FIGURE 1 to provide a driving arrangement for the unit or for other units if such is desired.

A modification is shown in FIGURES 2 and 3 wherein the characters 79 and 80 indicate adjacent arcuate strips which are alternately attached as at 81 and at 82a to adjacent segmental sections, these members 79 and 80 thereby providing an arrangement for maintaining the complete continuous peripheral outer boundaries of the circle, it being understood that any other such similar arrangements can be used. The character 84 indicates grooves.

FIGURE 6 illustrates a modification wherein a portion of the hub only is shown, it being understood, however, that all other details are as described hereinabove, and in this figure the character 85 indicates the central portion somewhat similar to the portion 20 shown in FIGURE 1, with the character 86 indicating a piston or plunger similar to the plunger 15 shown in FIGURE 1, except that the plunger does not include the sloping portion at the end thereof, the character 24 indicating the nut as in the other figure, with the balance of the structure in the portion 85 being identical to the structure shown in FIGURE 1, and being adapted to force the segments radially outwardly.

The character 87 indicates end portions of the hub, it also being understood that suitable pulley faces could be attached if desired to these portions.

The character 88 indicates a shaft attached by means of the keys 89 to the members 87, the character 90 indicating openings communicating with the longitudinally positioned opening 91 provided in the shaft 88.

The character 92 indicates a hollow tube which communicates at 93 with the passage 91, the character 94 indicating suitable packing, the character 95 indicating a ball race attached to the extending portion 96 of the shaft, the character 97 indicating ball bearings, and the character 98 indicating an inner ball bearing raceway which is attached to the tube 92.

Suitable oil under pressure is provided through the tube 92, which pressure can be controlled as desired, and it will be noted that by merely increasing the pressure of the oil, the members 86 will be forced radially outwardly to thereby provide the same results as above explained, this arrangement thereby providing a hydraulic pressure arrangement for this purpose.

FIGURES 7 and 8 illustrate a preferred modification to that shown in FIGURE 1, which modification pertains to the relationship of the posts 15 and the frusto-conical member 32 for the reasons to be explained.

In this modification I provide the dove-tail strips 99 which include the sloping side walls 100, the strips 99 being suitably attached by screws 101 or by any other means to the frusto-conical member 32, and at the bottom end of the posts 15 I provide a cavity 102 which receives the member 99. This construction will permit the posts 15 to remain in constant contact with the frusto-conical member 32 and will provide means whereby the members 15 will slide on the face of the member 32 while it rotates.

It will now be seen that I have provided the advantages mentioned in the objects of my invention, with further advantages being apparent.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

A hub comprising a central portion, a plurality of arcuate adjacently positioned peripheral segments, said segments including radially positioned posts attached thereto, said posts passing within said central portion, means for forcing said posts outwardly, including bevelled surfaces formed at the inner terminals of said posts, a frusto-conical member adapted to bear against said surfaces, means for moving said frusto-conical member longitudinally while said hub is running including a slidable member on which said frusto-conical member is journalled, hydraulic means for forcing said slidable member inwardly to move said frusto-conical member, means for mechanically moving said frusto-conical member including a reciprocating member locked against rotation, means mounted on said fixed member for moving said frusto-conical member including a lever, means for operating said lever remotely.

References Cited in the file of this patent

UNITED STATES PATENTS

| | | |
|---|---|---|
| 211,937 | Serighelli | Feb. 4, 1879 |
| 1,016,158 | Karr | Jan. 30, 1912 |
| 1,126,100 | Severy | Jan. 26, 1915 |
| 1,626,240 | Kosken | Apr. 26, 1927 |
| 2,119,395 | Locke | May 31, 1938 |
| 2,210,976 | Hallinan | Aug. 13, 1940 |
| 2,389,405 | Birchfield | Nov. 20, 1945 |

FOREIGN PATENTS

| | | |
|---|---|---|
| 384,506 | France | Apr. 11, 1908 |
| 931,392 | Germany | Aug. 8, 1955 |